United States Patent [19]

Wenning et al.

[11] Patent Number: 4,666,397
[45] Date of Patent: May 19, 1987

[54] FLUID COOLED BURNER

[75] Inventors: Hans-Peter Wenning, Dorsten; Joachim Friedrich, Recklinghausen; Bernd Pontow, Dorsten, all of Fed. Rep. of Germany

[73] Assignee: Veba Oel Entwicklungs-Gesellschaft mbH, Gelsenkirchen, Fed. Rep. of Germany

[21] Appl. No.: 792,906

[22] Filed: Oct. 30, 1985

[30] Foreign Application Priority Data

Nov. 2, 1984 [DE] Fed. Rep. of Germany ....... 3440088

[51] Int. Cl.⁴ .............................. F23D 11/36
[52] U.S. Cl. .................... 431/160; 431/346; 431/350; 239/132.3
[58] Field of Search ............... 431/160, 181, 187, 284, 431/346, 350, 353; 239/128, 132, 132.1, 132.3, 422, 424.5; 122/6.5, 6.6; 137/335

[56] References Cited

U.S. PATENT DOCUMENTS

| | | | |
|---|---|---|---|
| 3,032,096 | 5/1962 | Stout | 431/160 |
| 3,100,461 | 8/1963 | Werner | 431/160 X |
| 3,512,219 | 5/1970 | Stern et al. | 431/187 X |
| 3,563,683 | 2/1971 | Hess | 431/160 |

FOREIGN PATENT DOCUMENTS

| | | |
|---|---|---|
| 98043 | 1/1984 | European Pat. Off. . |
| 2253385 | 5/1974 | Fed. Rep. of Germany . |
| 254192 | 12/1948 | Switzerland ........................ 431/182 |

Primary Examiner—Margaret A. Focarino
Attorney, Agent, or Firm—Oblon, Fisher, Spivak, McClelland & Maier

[57] ABSTRACT

A burner having feed ducts for homogeneous or heterogeneous reactants and a burner cooling chamber placed peripherally in the area of a burner head, the burner including, coolant feed and discharge ducts in communication with the burner cooling chamber, a burner lance positionable in a recess in the burner cooling chamber, and a lance for accommodating the feed of the reactants as far as the burner orifice wherein the burner cooling chamber extends over the burner orifice in a downstream direction, starting from a downstream side of the burner orifice, and tapers conically to a smaller cross section so as to form a truncated conical burner prechamber, open on a downstream side thereof.

6 Claims, 1 Drawing Figure

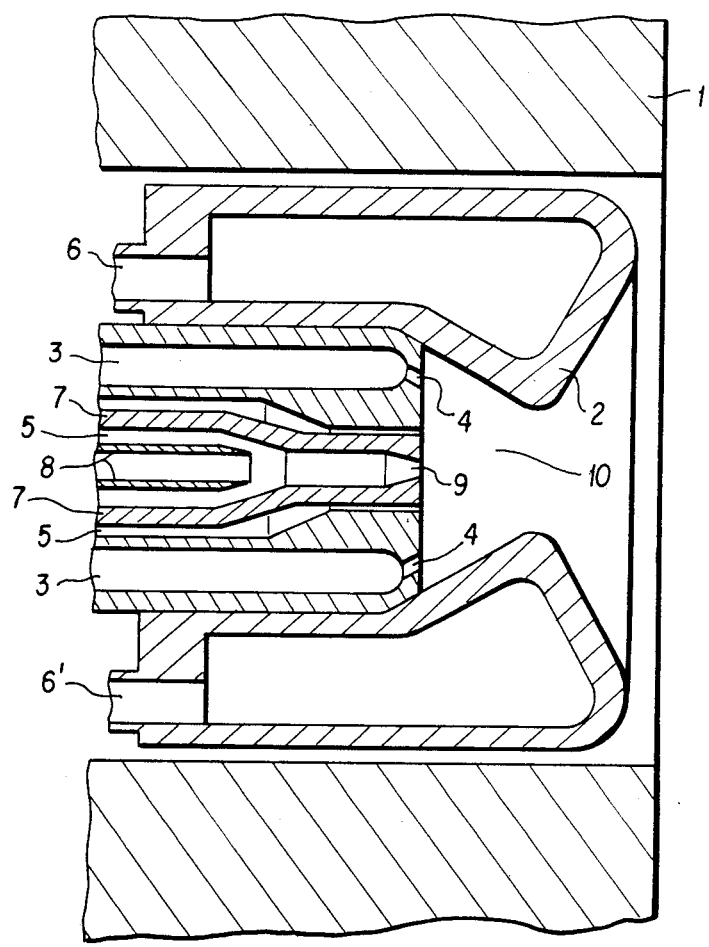

FLUID COOLED BURNER

BACKGROUND OF THE INVENTION

1. Field of the Invention:

The invention relates to a burner with feed ducts for homogeneous and heterogeneous reactants and burner cooling chamber placed peripherally in the area of the burner head, particularly for the production of synthesis gas.

2. Discussion of the Background:

A burner is shown in EP-OS 0 098 043. For better utilization of conventional petroleum in extracting low-boiling products or in exploitation of complementary raw materials such as very heavy oil or coal, conversion processes are being developed and used to an increasing extent.

One of the problems that occurs is the disposal of the resulting conversion residues, which, with decreasing feedstock quality and increasingly higher conversion rate, exhibit an increasingly higher percentage of harmful contents such as heavy metals and solids. The solid portions have gotten into the resulting residues by addition of catalysts, for example, in the processes of destructive or refining hydrogenation, whereby the solid portions are concentrated during the conversion process. In coal conversion, the solid portions are already partially present in the initial material in the form of socalled ash content. For example, in destructive hydrogenation of coal, the solid is also concentrated in the residue.

The residues of hydrogenation of carbonaceous material as well as the distillation of petroleums, bitumen and the like (but also of certain mineral oil fractions themselves) or even coal can be subjected to a conversion process by partial combustion and gasification.

To achieve an optimal conversion during gasification, the feedstock must arrive in the reaction zone as finely dispersed as possible. During oxidation of the gasification feedstock with a gas containing free oxygen and during heterogeneous conversions occurring simultaneously with steam added at the same time and optionally other components added, e.g., a moderator gas, the size of the contact surface between gas phase and fuel phase is decisive for the conversion that can be attained during the gasification reaction.

In the case of known gasification burners, the fine dispersion of the feedstock necessary for as high as possible a conversion of the gasification reaction is attained through a narrow constriction of the fuel intake with an appropriately high pressure drop and a high velocity in the atomizer nozzle. In the case of atomizing of abrasive media, such as residue suspensions containing solids from conversion processes, the high nozzle velocity necessary for an optimal atomizing would result in great wear and a correspondingly short service life of the burner.

Atomizing of solid suspensions over a narrow nozzle cross section, moreover, would result in a tendency toward clogging of the nozzle, an irregular delivery and a variable composition in the amount of product gas.

The gasification flame exhibits its highest temperature in the gasification reactor in the vicinity of the burner orifice. The exothermic, energy-releasing partial oxidation of the fuel can occur there only through the excess oxygen present directly on the burner orifice. As a result of the high flame temperature, strong thermal stress of the burner orifice results from radiation. In the interaction between the resulting elevated material temperature and the oxygen-containing atmosphere in the vicinity of the burner, there is a danger of high temperature corrosion occurring or at worst in case of insufficient heat removal of burning off the burner tip. The temperature stress can be reduced by raising the discharge velocity. However, with a high discharge velocity the danger is increased of back turbulence and, with it, ignition again in the vicinity of the burner.

When ash-containing fuel is used, the reactor temperature during gasification or during synthesis gas production is near or above the melting temperature of the resulting slag. For this reason, there is the danger of a slow slagging of the burner discharge opening, which can be accompanied by a change of the shape of the flame and a disturbance or impairment of the gasification process.

SUMMARY OF THE INVENTION

The object of the invention is to avoid slagging of the burner and damage to the burner tip or orifice by overheating. More particularly, the object is to guarantee that ignition of the fuel suspension in the burner orifice is impossible.

Accordingly, the burner cooling chamber of the present invention is so designed that ignition of the fuel cannot occur in the vicinity of the burner orifice and radiant thermal stress of the burner is minimal.

By grouping the feeding of the reactants in an assembly of coaxial ducts, which is introduced as a burner lance in an appropriate recess in the burner cooling chamber, fast assembly and replacement is possible.

It now has been found that the buildup of slagging can be reduced and a better removal of slag deposits from the burner tip and other necessary alignments, servicing and repairs can be made if the subject burner comprises coolant feed and discharge ducts in communication with said burner cooling chamber; a burner lance positioned in a recess in the burner cooling chamber; and a lance for accommodating the feed of said reactants as far as the burner orifice wherein said burner cooling chamber surrounds said burner orifice in a downstream direction, starting from a downstream side of the burner orifice, and tapers conically to a smaller cross section so as to form a truncated conical burner prechamber, open on a downstream side thereof.

More specifically the subject burner further comprises first means forming a passage having a circular cross section for a first axially carried stream of said reactant and which is in communication with the burner prechamber, second means forming a passage for a coaxially carried reactant or moderator in communication with the burner prechamber through an annular orifice and having a greater average diameter than the diameter of said first means forming a passage for said axially carried stream, and third means forming a passage for a coaxially carried reactant in communication with said burner prechamber and having a greater average diameter than the average diameter of said second means forming a passage for said coaxially carried stream.

In an advantageous embodiment, the burner lance is made from a central pipe which is designed as a jacket duct surrounded by an additional jacket pipe and which ends at a distance upstream of the burner orifice, and the jacketed central pipe is surrounded by two additional coaxial pipes.

In a further development of the burner, the jacket pipe on the burner orifice tapers off into an axial nozzle with a circular nozzle mouth.

The truncated conical burner prechamber with its base surface is in the plane of the burner orifice and is limited to a narrower cross section in the opposite surface by an opening with a narrower cross section by means of the inclined flanks of the burner cooling chamber which correspondingly project in the direction of the burner longitudinal axis.

Thus, the inclined flanks of the burner prechamber form an angle of about 30° to 60° with their imaginary extension to the burner longitudinal axis. The ratio of the diameter of the cross section of the burner prechamber in the plane of the burner orifice to the diameter of the opening of the chamber is between 3:1 to 1.5:1.

The axially directed stream of a homogeneous or heterogeneous reactant or reactant mixture can be, for example, an appropriately heated heavy oil, a preheated, transportable and pumpable residue containing solids or also a stream of ground coal particles. The adjacent coaxial stream, leaving the burner orifice as an annular stream, is advantageously a stream of a moderator gas or a separation gas. Recirculated process gas, e.g. stripping gas from the gas scrubbings, can be used as separation gas. In this case, when the burner is operated the concentrated harmful components of the gas in the reaction zone of the burner are decomposed into the main constituents hydrogen, carbon monoxide and nitrogen. Optionally the carbon dioxide contained in the stripping gas modifies the gasification reaction and is partially converted to carbon monoxide. In addition, flash gases, e.g. such as separation gas from a refinery area, can be used in the annular stream adjacent to the axial stream. Also flash gases from pressure processes such as methanol or ammonia synthesis or hydrogenating conversion processes can also advantageously be used here.

The necessary oxygen in the form of a gas containing free oxygen, as outer annular stream is carried coaxially in the other coaxial stream surrounding the axial central stream and the coaxial stream adjacent thereto, whereby discharge on the burner orifice occurs by discharge bores placed parallel to the inner wall of the conical burner prechamber or by a ring slot inclined in the direction of the burner longitudinal axis parallel to the inner wall of the burner cooling chamber.

Through the separation between fuel feed by the axial duct and the feed of the gas containing free oxygen by the outer coaxial duct through the separation or moderator gas fed by the inner coaxial duct, the danger of slagging of the burner orifice by back turbulence, particularly in the case of ash-containing residue suspensions, is reduced. Also the danger of high temperature corrosion of the burner orifice is additionally reduced by the stream of separator or moderator gas that is provided, which in addition can also take on a cooling function, and by the separation of fuel and oxygen feed brought about by this means.

In a further advantageous design of this burner, steam or another moderator gas is added by the jacket pipe, like an injection, to the fuel stream carried axially in the central pipe. In this case, the solid is accelerated and atomized by the steam or moderator gas. Despite a high discharge velocity, wear in the axial atomizer nozzle is reduced through the stream of steam carried on the outside around the fuel like a jacket.

The free oxygen fed by the outer coaxial duct can enter with or without spin. The oxygen keeps the sprayed residue from the inner wall of the cooled chamber by the annular arrangement.

The temperature on the outer wall of the burner cooling is adequately lowered by the water stream carried in the burner chamber by the cooling water feed duct and cooling water discharge duct, whereby the burner cooling chamber at a distance downstream from the burner orifice steadily changes to a wider annular cross section. The cross section enlargement protects the burner orifice from the radiation of the reaction zone.

By protection from thermal radiation by means of the water-cooled burner cooling chamber, the temperature remains low enough to reliably avoid, in cooperation with an adequate velocity of the reactants, an ignition of the mixture in the burner cooling chamber.

BRIEF DESCRIPTION OF THE DRAWING

An embodiment of the burner according to the invention is shown in longitudinal section in the sole FIGURE.

DESCRIPTION OF THE PREFERRED EMBODIMENT

The indicated reference numbers in the sole FIGURE illustration the burner according to the present invention are as follows: 1 indicates a reactor, 2 a burner cooling chamber, 3 an outer annular duct, 4 an annular slot or discharge bore for outer annular duct, 5 an inner annular duct, 6, 6' the cooling water intake duct and cooling water discharge duct, respectively, 7 a jacket duct for central pipe, 8 a central pipe, 9 a discharge nozzle, and 10 a burner prechamber.

The assembled unit of the burner lance, consisting of outer annular duct 3 with the discharge bores or annular slots 4, inner annular duct 5 as well as jacket duct 7 with central pipe 8, is made up of a system of appropriately shaped coaxial pipe elements which, according to the state of the art, form a compact and dimensionally stable unit by spacers and welded joints. Central pipe 8 ends a distance upstream from the burner orifice. Jacket duct 7, surrounding central pipe 8, on the downstream end of the central pipe inside the burner changes to a narrower cross section, reduced to about the cross section of central pipe 8, and optionally is tapered further to the discharge cross section of discharge nozzle or orifice 9. As can be appreciated from the sole FIGURE, annular slots 4 are located in the same axial plane as discharge nozzle 9.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A burner which includes feed pipes for homogeneous or heterogenous reactants, comprising:
   a peripherally extending cooling chamber located near a burner head portion of said burner;
   at least one coolant feed pipe and coolant drain pipe connected to said cooling chamber wherein said cooling chamber surrounds an orifice portion of said burner that extends in a downstream direction, wherein side portions of said cooling chamber are inclined in a downstream direction along a longitudinal axis of the burner so as to form an inwardly tapered burner prechamber wherein a base portion of said burner prechamber lies in the plane of said orifice portion and wherein an area of said burner prechamber opposite said base portion forms an opening having a cross-section which is more narrow than that formed at said base portion of said burner prechamber.

2. A burner according to claim 1, further comprising a central pipe through which a flow of a first reactant is axially carried to said orifice portion for discharge therefrom into said burner prechamber; and an annular pipe surrounding said central pipe for coaxially carrying a flow of a second reactant for being discharged into the orifice portion wherein the pattern of discharge of the second reactant is of a larger average diameter upon being discharged than a diameter dimension of said orifice portion of said burner, and further comprising a circular pipe surrounding said annular pipe for coaxially carrying a third reactant, said circular pipe having a plurality of discharge bores formed therein so as to form a circle of discharge bores surrounding said annular pipe such that the discharge from said discharge bores is of a greater average diameter than the average diameter of the discharge of said second reactant from said annular pipe.

3. A burner according to claim 1, wherein a ratio of the diameter of the cross-section of said burner prechamber located adjacent the orifice portion of the burner to the diameter of a smallest open cross-section of the burner prechamber is between 3:1 to 1.5:1.

4. A burner according to claim 1, further comprising a jacket duct surrounding said circular pipe, and wherein said jacket duct, said annular pipe and said central pipe form a lance.

5. A burner according to claim 2, further comprising a jacket duct wherein said central pipe is surrounded by said jacket duct and said orifice portion of said burner is formed at one end of said jacket duct such that an end wall of said central pipe is located at a predetermined distance from an upstream side of said orifice of said burner.

6. A burner according to claim 2, wherein said orifice portion of said burner and said discharge bores of said circular pipe are located in the same axial plane of said burner.

* * * * *